(12) United States Patent
Maeda et al.

(10) Patent No.: US 7,190,427 B2
(45) Date of Patent: Mar. 13, 2007

(54) REFLECTIVE PLATE, PRODUCTION METHOD THEREFOR, LIQUID CRYSTAL DEVICE, AND ELECTRONIC DEVICE

(75) Inventors: Tsuyoshi Maeda, Ryuo-cho (JP); Kimitaka Kamijo, Shiojiri (JP); Kinya Ozawa, Suwa (JP); Hitoshi Tsuchiya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 10/351,506

(22) Filed: Jan. 27, 2003

(65) Prior Publication Data

US 2003/0142256 A1    Jul. 31, 2003

(30) Foreign Application Priority Data

Jan. 28, 2002  (JP) .................................... 2002-018458

(51) Int. Cl.
     *G02F 1/1335*    (2006.01)

(52) U.S. Cl. ........................ 349/115; 349/129
(58) Field of Classification Search ............. 349/115, 349/129
     See application file for complete search history.

(56) References Cited

U.S. PATENT DOCUMENTS

| | | | | |
|---|---|---|---|---|
| 4,277,144 A | * | 7/1981 | Saurer et al. | ............... 349/129 |
| 4,333,708 A | * | 6/1982 | Boyd et al. | ................. 349/129 |
| 4,725,460 A | * | 2/1988 | Matsuo et al. | ............. 428/1.31 |
| 5,594,570 A | | 1/1997 | Hirata et al. | |
| 5,648,829 A | * | 7/1997 | Yano | .......................... 349/129 |
| 5,652,634 A | | 7/1997 | Hirata et al. | |
| 5,847,798 A | * | 12/1998 | Yang et al. | ................. 349/169 |
| 5,855,968 A | | 1/1999 | Hirata et al. | |
| 5,917,570 A | | 6/1999 | Bryan-Brown et al. | |
| 6,025,899 A | * | 2/2000 | Fukunaga et al. | .......... 349/115 |
| 6,580,482 B1 | | 6/2003 | Hiji et al. | |
| 6,630,974 B2 | * | 10/2003 | Galabova et al. | ........... 349/119 |
| 6,714,273 B2 | * | 3/2004 | Bryan-Brown et al. | ...... 349/129 |
| 6,809,788 B2 | * | 10/2004 | Yamada et al. | ............. 349/129 |

FOREIGN PATENT DOCUMENTS

| | | |
|---|---|---|
| JP | 07-168187 | 7/1995 |
| JP | 11-202303 | 7/1999 |
| JP | A 2000-122059 | 4/2000 |
| JP | A 2000-171789 | 6/2000 |
| JP | A 2000-193962 | 7/2000 |
| JP | A 2000-321408 | 11/2000 |
| JP | 2001-083516 | 3/2001 |
| JP | 2001-133629 | 5/2001 |
| JP | A 2001-183644 | 7/2001 |

(Continued)

OTHER PUBLICATIONS

Akihito Shiozawa et al., Optical Properties of Diffusion–Type Cholesteric Liquid Crystalline Polymer Film, Mol. Cryst. and Liq. Cryst., 2001, vol. 364, pp. 469–478.

*Primary Examiner*—Toan Ton
(74) *Attorney, Agent, or Firm*—Oliff & Berridge, PLC (57) ABSTRACT

The invention provides a thin reflective plate having cholesteric liquid crystal that can prevent or reduce a decrease of reflection efficiency. A reflective plate includes a cholesteric liquid crystal layer, and the cholesteric liquid crystal layer includes a plurality of regions in which the helical axes of the cholesteric liquid crystal are aligned in different directions in the plane of a substrate, and therefore, the regions can reflect color light components having different wavelengths. Consequently, the cholesteric liquid crystal layer can reflect light formed of light components of different colors (for example, white light) as a whole. When the reflective plate is applied to a reflective liquid crystal display device or the like, it is possible to appropriately reflect white light for display.

12 Claims, 6 Drawing Sheets

FOREIGN PATENT DOCUMENTS

| | | |
|---|---|---|
| JP | A 2001-337320 | 12/2001 |
| JP | A 2001-357979 | 12/2001 |
| JP | A 2002-72201 | 3/2002 |
| JP | A 2002-221713 | 8/2002 |
| JP | 2002-267107 | 9/2002 |
| KR | 352868 | 9/2002 |
| KR | 2002-2248 | 9/2002 |
| WO | WO 02/01260 A1 | 1/2002 |

\* cited by examiner

REFLECTIVE PLATE, PRODUCTION METHOD THEREFOR, LIQUID CRYSTAL DEVICE, AND ELECTRONIC DEVICE

BACKGROUND OF THE INVENTION

1. Field of Invention

The present invention relates to a reflective plate and a production method therefor, a liquid crystal device, and an electronic device. More particularly, the invention relates to a reflective plate having a cholesteric liquid crystal layer and a production method therefor, a liquid crystal device having the reflective plate, and an electronic device having the liquid crystal device.

2. Description of Related Art

The related art includes cholesteric reflective plates using cholesteric liquid crystal. Liquid crystal molecules form periodic helical structures at a fixed pitch in the cholesteric liquid crystal, and the cholesteric liquid crystal has the property of selectively reflecting a light component of incident light having a wavelength corresponding to the helical pitch and the refractive index. Therefore, the use of a reflective plate having such cholesteric liquid crystal makes it possible to provide a liquid crystal device which can selectively reflect a light component of incident light having a specific wavelength.

SUMMARY OF THE INVENTION

Some reflective plates using such cholesteric liquid crystal achieve a reflective display that is close to white by stacking three layers having different helical pitches corresponding to the wavelengths of colors, such as red, green, and blue. In this case, since a plurality of layers are stacked, the layer thickness is increased, and the size of the reflective plate itself is increased. Moreover, for example, since light is absorbed by liquid crystal molecules until it reaches the lowermost layer, the reflection efficiency is decreased. Furthermore, since the number of production processes is increased by stacking, the cost may be increased.

The present invention addresses or solves the above and/or other problems, and provides a thin reflective plate having cholesteric liquid crystal that can prevent or reduce a decrease of reflection efficiency, and a production method therefore. The invention also provides a liquid crystal device using the reflective plate and an electronic device having the liquid crystal device.

In order to address or achieve the above, a reflective plate of the present invention is provided such that a cholesteric liquid crystal layer is formed on a substrate, and the helical axes of cholesteric liquid crystal in the cholesteric liquid crystal layer are aligned in different directions at least in a substrate plane.

The reflective plate having the cholesteric liquid crystal layer can reflect color light having a wavelength corresponding to the helical pitch of the helical structure formed by the cholesteric liquid crystal. In the present invention, the helical axes of the helical structures formed by the cholesteric liquid crystal in the cholesteric liquid crystal layer are aligned in different directions at least in the substrate plane, and the helical pitch viewed from the direction perpendicular to the substrate plane differs among the regions in which the helical axes are aligned in different directions. Therefore, the wavelength of the reflected color light from the reflective plate viewed from the direction perpendicular to the substrate plane differs among the regions in which the helical axes are aligned in different directions, that is, light formed of light components of different colors (for example, white light) can be reflected. For example, when the reflective plate is applied to a reflective display device, white light can be appropriately reflected for display. In the present invention, light of mixed color (for example, white light) is not reflected by stacking cholesteric liquid crystal layers, and instead is reflected by forming, in the substrate plane, a plurality of regions in which the helical axes are aligned in different directions. Therefore, the cholesteric liquid crystal layer, and the reflected plate can be made of a thin film, and this enhances the thickness uniformity. Furthermore, in the present invention, since the helical axes of the helical structures formed by the cholesteric liquid crystal are aligned in various directions in the substrate plane, the distribution of the refractive index is increased, and reflected light can be scattered without providing a separate scattering layer.

The cholesteric liquid crystal layer may include at least two of a cholesteric liquid crystal region in which the helical axes are aligned substantially perpendicularly to the substrate plane, a cholesteric liquid crystal region in which the helical axes are aligned substantially parallel to the substrate plane, and a cholesteric liquid crystal region in which the helical axes tilt at a predetermined angle to the substrate plane. In this case, since at least two of the cholesteric liquid crystal regions in which the helical axes are aligned perpendicularly to, tilt relative to, and are aligned parallel to the substrate plane are included, at least two types of color components can be reflected by these regions, and therefore, light of mixed color containing a plurality of colors can be reflected. In particular, when all of the three cholesteric liquid crystal regions are included, color light that is closer to white can be reflected, and the reflective plate that can reflect white light is suitably used for a reflective display device.

More specifically, a helical-axis-direction aligning device may be provided so as to align the helical axes of the cholesteric liquid crystal in different directions in the substrate plane. In this case, the helical-axis-direction aligning device allows the helical axes of the helical structures formed by the cholesteric liquid crystal to be aligned in different directions at least in the substrate plane. More specifically, an alignment layer capable of aligning cholesteric liquid crystal may be formed as the helical-axis-direction aligning device between the substrate and the cholesteric liquid crystal layer, and may be locally formed in the substrate plane. In this case, by locally forming the alignment layer in the substrate plane, the alignment state of the cholesteric liquid crystal differs between a region in which the alignment layer is formed and a region in which the alignment layer is not formed. Therefore, it is possible at least to form regions in which the helical axes of the helical structures formed by the cholesteric liquid crystal are aligned in different directions. The alignment layer may be formed, for example, by rubbing a polyimide film.

An alignment layer that is capable of aligning the cholesteric liquid crystal may be formed as the helical-axis-direction aligning device between the substrate and the cholesteric liquid crystal layer, and may include a homeotropic alignment layer and a homogeneous alignment layer, and the homeotropic alignment layer and the homogeneous alignment layer may be in contact with the cholesteric liquid crystal layer. In this case, the alignment state of the cholesteric liquid crystal differs between a cholesteric liquid crystal region in contact with the homeotropic alignment layer and a cholesteric liquid crystal region in contact with the homogeneous alignment layer, and therefore, the direction of the helical axes of the helical structures formed by the cholesteric liquid crystal also differs between the liquid crystal regions.

The homeotropic alignment layer and the homogeneous alignment layer may be made of an alignment film formed, for example, by rubbing a polyimide film, and can be respectively obtained by using different kinds of polyimides. More specifically, it is preferable to use polyimides having different side chains of polyimide molecules. For example, by changing the direction of the above-described rubbing, the respective alignment layers can be obtained. For example, the homeotropic alignment layer may refer to an alignment layer in which the pretilt angle is relatively large, and the homogeneous alignment layer may refer to an alignment layer in which the pretilt angle is relatively small.

An alignment layer that is capable of aligning the cholesteric liquid crystal may be formed as the helical-axis-direction aligning device between the substrate and the cholesteric liquid crystal layer, and may have irregularities on its surface along the border with the cholesteric liquid crystal layer. In this case, the cholesteric liquid crystal is in contact with the irregularities formed on the alignment layer, the helical axes of the helical structures formed by the cholesteric liquid crystal tilt in various directions with respect to the substrate plane depending on the inclinations of the irregularities, and a plurality of regions in which the helical axes are aligned in different directions are formed in the substrate plane. By forming irregularities on the substrate surface, irregularities can be formed on the alignment layer placed between the substrate and the cholesteric liquid crystal layer. For example, irregularities can be formed on the alignment layer by forming an acrylic layer on the substrate and forming irregularities on the acrylic layer.

The helical-axis-direction aligning device may be a filler charged in the cholesteric liquid crystal layer. In this case, the alignment state of the cholesteric liquid crystal differs between a portion that is charged with the filler and a portion that is not charged with the filler, and therefore, the helical axes of the helical structures formed by the cholesteric liquid crystal are aligned in different directions between the charged portion and the uncharged portion. The filler may be, for example, resin or glass beads or fibers. The surface of the filler may be subjected to homeotropic surface treatment, and the cholesteric liquid crystal can be aligned in a plurality of directions on the surface of the filler by such homeotropic surface treatment. Furthermore, by making the filler substantially spherical, the cholesteric liquid crystal can be aligned in more directions by the substantially spherical surface, and the direction of the helical axes of the cholesteric liquid crystal can more reliably differ between the charged portion and the uncharged portion.

A reflective-plate production method of the present invention includes forming a cholesteric liquid crystal layer on a substrate. The cholesteric liquid crystal layer forming step includes applying a cholesteric liquid crystal monomer, and polymerizing the applied cholesteric liquid crystal monomer. In the monomer application step, the cholesteric liquid crystal monomer is applied in an isotropic state, and is then supercooled.

Such a production method makes it possible to obtain the above-described reflective plate of the present invention having the cholesteric liquid crystal layer including a plurality of regions in which the helical axes of the cholesteric liquid crystal are aligned in different directions in the substrate plane. That is, when the cholesteric liquid crystal monomer in an isotropic state is supercooled, it partially remains in the isotropic state. By polymerizing the monomer, a cholesteric liquid crystal layer in which the orientation has a given distribution can be formed. Therefore, a plurality of regions in which the helical axes are aligned in different directions are formed in the cholesteric liquid crystal layer. In this case, in the monomer application step, the cholesteric liquid crystal monomer is applied at a temperature higher than or equal to the temperature $T_1$ at which it has an isotropic phase, more specifically, at approximately $(T_1+30°)$, and is then supercooled to a temperature lower than or equal to $T_I$, more specifically, approximately $(T_1-30°)$. The cholesteric liquid crystal monomer in this specification refers to a monomer that can have a cholesteric liquid crystal phase by polymerization. In the above monomer polymerizing step, the applied cholesteric liquid crystal monomer may be polymerized by ultraviolet irradiation or heating.

A reflective-plate production method of the present invention includes forming a cholesteric liquid crystal layer on a substrate. The cholesteric liquid crystal layer forming step includes at least applying a cholesteric liquid crystal monomer, and polymerizing the applied cholesteric liquid crystal monomer by ultraviolet irradiation. In the monomer polymerizing step, the ultraviolet dose has a distribution in the substrate plane when ultraviolet irradiation is performed. Such a production method makes it possible to obtain the above-described reflective plate of the present invention having the cholesteric liquid crystal layer including a plurality of regions in which the helical axes of the cholesteric liquid crystal are aligned in different directions in the substrate plane. That is, by providing the ultraviolet dose with a distribution in the substrate plane, the orientation of the cholesteric liquid crystal layer has a distribution corresponding to the distribution of the ultraviolet irradiation, and therefore, a plurality of regions in which the helical axes are aligned in different directions are formed in the cholesteric liquid crystal layer. In order that the ultraviolet dose can have such a distribution in the substrate plane, for example, only a region that is not covered with a photomask may be irradiated with ultraviolet rays. Alternatively, the ultraviolet dose in the region having the photomask may be smaller than in the region having no photomask. In the monomer polymerizing step, heating may be performed instead of ultraviolet irradiation so that it has a given distribution in the substrate plane.

A reflective-plate production method of the present invention includes forming a cholesteric liquid crystal layer on a substrate, and forming an alignment layer on the substrate before the cholesteric liquid crystal layer forming step. The alignment layer is locally formed on the substrate in the alignment layer forming step. Such a production method makes it possible to obtain the above-described reflective plate of the present invention having the cholesteric liquid crystal layer including a plurality of regions in which the helical axes of the cholesteric liquid crystal are aligned in different directions in the substrate plane. That is, since the orientation of the cholesteric liquid crystal differs between a region having the alignment layer and a region having no alignment layer, a plurality of regions in which the helical axes are aligned in different directions are formed in the cholesteric liquid crystal layer.

A reflective-plate production method of the present invention includes forming a cholesteric liquid crystal layer on a substrate, and forming an alignment layer on the substrate before the cholesteric liquid crystal layer forming step. A homeotropic alignment layer and a homogeneous alignment layer are stacked in the alignment layer forming step. One of the homeotropic alignment layer and the homogeneous alignment layer that is formed on the front side is partially removed with a mask. Such a production method makes it possible to obtain the above-described reflective plate of the present invention having the cholesteric liquid crystal layer including a plurality of regions in which the helical axes of the cholesteric liquid crystal are aligned in different directions in the substrate plane. That is, since one of the homeotropic alignment layer and the homogeneous alignment layer that is formed on the front side is partially removed with a mask, both the homeotropic alignment layer and the homogeneous alignment layer are in contact with the cholesteric liquid crystal layer. This makes it possible to make the orientation of the cholesteric liquid crystal different between the regions in contact with the alignment layers, and to form a plurality of regions, in which the helical axes are aligned in different directions, in the cholesteric liquid crystal layer. The homeotropic alignment layer and the homogeneous alignment layer can be formed by using different kinds of polyimides, and more particularly, by using polyimides having different side chains of polyimide molecules.

A liquid crystal device of the present invention has the above-described reflective plate. In such a liquid crystal device, the advantages of the above-described reflective plate are provided, and it is possible to form a thin reflective layer that can produce a reflective display that is closer to white. A specific example is a liquid crystal device having a liquid crystal cell in which a liquid crystal layer is held between an upper substrate and a lower substrate opposing each other and made of a transmissive substrate. A reflective layer that is capable of reflecting at least circularly polarized light that rotates in a predetermined direction may be formed on the inner side of the lower substrate, and may have the above reflective plate.

In this case, since the reflective layer having the reflective plate can be made of a thin film, the thickness of the liquid crystal cell can be made to be more uniform, and the visibility of the liquid crystal device is increased. In such a liquid crystal device, since the helical axes of the helical structures formed by the cholesteric liquid crystal in the cholesteric liquid crystal layer contained in the reflective plate are aligned in various directions in the substrate plane, the distribution of the refractive index is increased, light reflected by the cholesteric liquid crystal layer can be scattered, the viewing angle of the reflective display can be increased, and there is no need or substantially no need to provide a separate scattering layer.

An electronic device of the present invention has the liquid crystal device having the above-described configuration. This can provide an electronic device that can produce a highly visible reflective display.

DETAILED DESCRIPTION OF PREFERRED EMBODIMENTS

[Reflective Plate]

An embodiment of the present invention will be described below with reference to the drawings. In all the drawings, the proportions of the thickness, dimensions, and the like of the components appropriately vary for easy reference.

Figure 1:
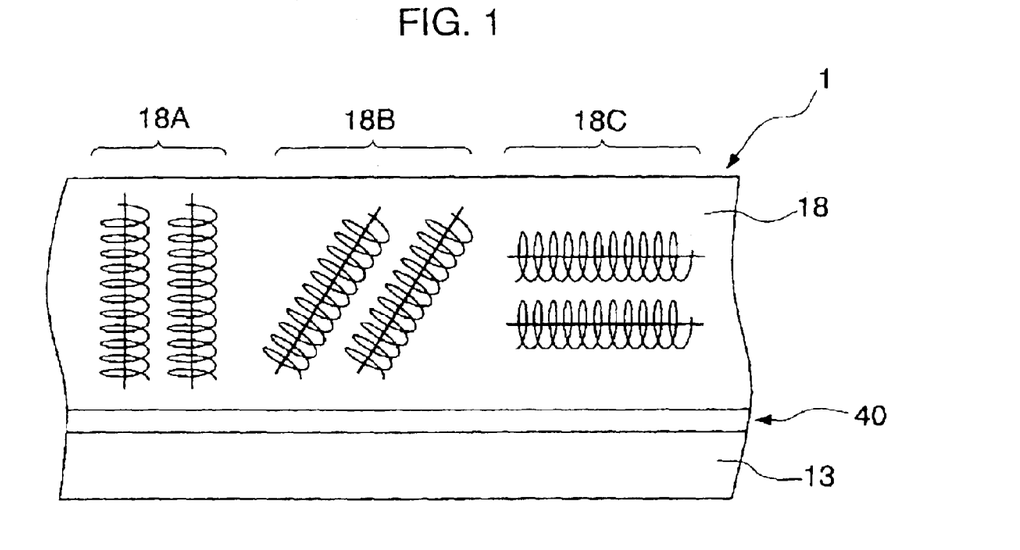
FIG. 1 is a schematic showing the partial sectional configuration of a reflective plate according to an exemplary embodiment of the present invention.

FIG. 1 is a partial schematic sectional view showing a reflective plate according to an exemplary embodiment of the present invention. In a reflective plate 1, an alignment layer 40 is formed on a transmissive substrate 13, and a cholesteric liquid crystal layer 18 serving as a main reflective layer is formed on the alignment layer 40. In this case, for example, light to be used for reflection enters from the opposite side of the transmissive substrate 13 in the thickness direction. The cholesteric liquid crystal layer 18 principally contains cholesteric liquid crystal in which the helical alignment state is fixed, has a selective reflection property of reflecting only circularly polarized light that rotates in a predetermined direction, and can reflect light with a wavelength corresponding to the helical pitch of liquid crystal molecules. A transmissive substrate may also be provided on the opposite side of the transmissive substrate 13 with the cholesteric liquid crystal layer 18 therebetween so that the cholesteric liquid crystal layer 18 serving as the main reflective layer is held between these substrates.

In the cholesteric liquid crystal layer 18 serving as the main reflective layer in the reflective plate 1 of this embodiment, the helical axes of the helical structures formed by the cholesteric liquid crystal are aligned in various directions in the plane of the substrate 13. That is, the cholesteric liquid crystal layer 18 serving as the main reflective layer includes a plurality of regions in which the helical axes of the helical structures formed by the cholesteric liquid crystal in the substrate plane are aligned in different directions, for example, a helical-axis vertically-aligned cholesteric liquid crystal region 18A, a helical-axis obliquely-aligned cholesteric liquid crystal region 18B, and a helical-axis parallel-aligned cholesteric liquid crystal region 18C. More specifically, the helical axes are aligned substantially perpendicularly to the substrate plane in the helical-axis vertically-aligned cholesteric liquid crystal region 18A, are aligned at a predetermined angle to the substrate plane in the helical-axis obliquely-aligned cholesteric liquid crystal region 18B, and are aligned substantially parallel to the substrate plane in the helical-axis parallel-aligned cholesteric liquid crystal region 18C. While the helical axes are aligned in clearly different directions among the regions and the helical axes in each region are aligned in the same direction in the figure, in actuality, the helical axes are not always aligned in clearly different directions among the regions, and the helical axes in each region are not always aligned in the same direction. However, as described below, in this embodiment, cholesteric liquid crystal regions in which the helical axes are aligned at least substantially vertically to, substantially parallel to, or at an angle to the substrate plane are formed by intentionally forming a helical-axis-direction aligning means, or by aligning the helical axes in different directions in the substrate plane during production. When the helical axis direction in each region is defined, the helical-axis vertically-aligned cholesteric liquid crystal region 18A may refer to a region containing cholesteric liquid crystal, in which the helical axes and the substrate plane form an angle of 80° to 90°, in the substrate plane, and the helical-axis parallel-aligned cholesteric liquid crystal region 18C may refer to a region containing cholesteric liquid crystal, in which the helical axes and the substrate plane form an angle of 0° to 10°, in the substrate plane. The other region may refer to the helical-axis obliquely-aligned cholesteric liquid crystal region 18B.

In such regions 18A, 18B, and 18C that are different in helical axis direction, the helical pitch that is viewed from the direction perpendicular to the substrate plane differs. Therefore, color light components having different wavelengths are reflected by the regions 18A, 18B, and 18C, as viewed from the side of the reflective plate 1 perpendicular to the substrate plane, that is, it is possible to reflect light containing different color light components (for example, white light). This cholesteric liquid crystal layer can be made to be thinner compared with cholesteric liquid crystal layers in which the helical axes are aligned in the same direction, stacked so as to reflect mixed color light (for example, white light), and moreover, it is possible to make the reflective plate 1 of a thin plate and to enhance the thickness uniformity. By forming cholesteric liquid crystal regions in which the helical pitch, viewed from the direction perpendicular to the substrate plane, is approximately 450 nm, 550 nm, and 600 nm, respectively, blue light, green light, and red light can be reflected, and color light that is even closer to white can be reflected.

Figure 9:
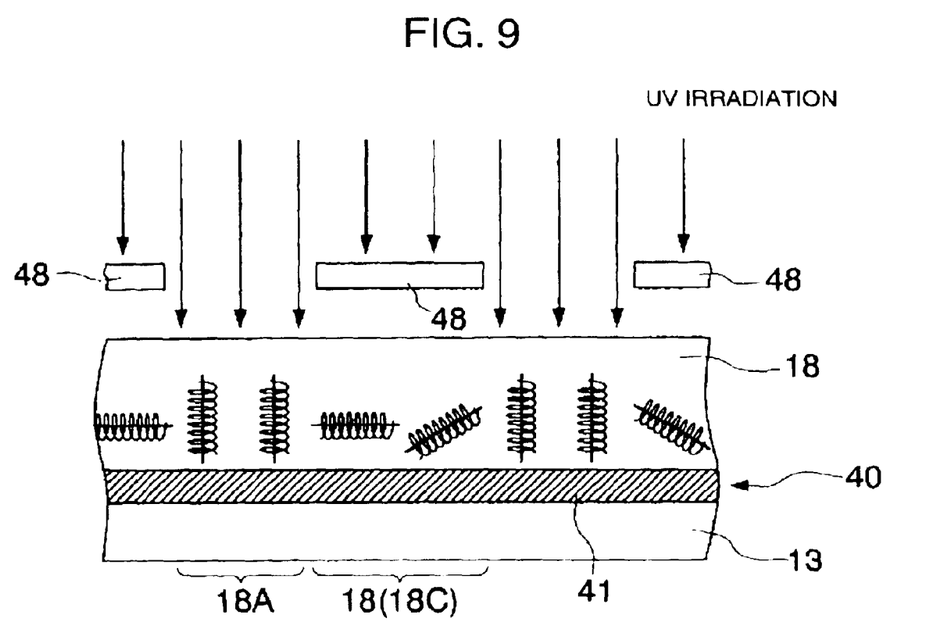
FIG. 9 is a schematic illustrating a production method for the reflective plate shown in FIG. 1.

The reflective plate 1 having the cholesteric liquid crystal layer 18 in which the helical axes of the cholesteric liquid crystal are aligned in different directions in the substrate plane, as in this embodiment, can be produced in the following method. First, a predetermined alignment film, a rubbed polyimide film in this case, is formed on a transmissive substrate 13, thereby obtaining an alignment layer 40. Subsequently, a cholesteric liquid crystal monomer is applied onto the formed alignment layer 40, and is polymerized by irradiation with ultraviolet rays, as shown in FIG. 9. In this case, the alignment layer may be formed of, for example, a homogeneous alignment layer 41. The cholesteric liquid crystal monomer refers to a monomer that is polymerized to form cholesteric liquid crystal.

In the monomer polymerizing process shown in FIG. 9, a mask 48 is locally placed so that the ultraviolet dose has a distribution, and in this case, the ultraviolet dose is small in the regions covered with the mask 48. Therefore, in unmasked regions, helical-axis vertically-aligned cholesteric liquid crystal regions 18A are formed in which the ultraviolet dose is relatively large, the cholesteric liquid crystal is sufficiently aligned, and the helical axes are aligned perpendicularly to the substrate plane. In masked regions, helical-axis obliquely-aligned cholesteric liquid crystal regions 18B (helical-axis parallel-aligned cholesteric liquid crystal regions 18C) are formed in which the ultraviolet dose is relatively small, the alignment of the cholesteric liquid crystal is less sufficient than in the unmasked regions, and the helical axes are oriented in various directions.

The reflective plate 1 including the above-described cholesteric liquid crystal layer 18 may be produced in the following method. First, a predetermined alignment film, a rubbed polyimide film in this case, is formed on a transmissive substrate 13, thereby obtaining an alignment layer 40. Subsequently, a cholesteric liquid crystal monomer is applied onto the formed alignment layer 40 at an isotropic temperature, is subjected to supercooling, and is polymerized by irradiation with ultraviolet rays, thereby obtaining the reflective plate 1 of this embodiment. The isotropic temperature refers to a temperature at which cholesteric liquid crystal exists in an isotropic state, and the supercooling refers to a process of rapidly cooling a cholesteric liquid crystal monomer, which is placed at an isotropic temperature, to a temperature at which the cholesteric liquid crystal monomer is brought into an anisotropic state.

In this case, when a cholesteric liquid crystal monomer in an isotropic state is supercooled, a part thereof still remains in the isotropic state, and a cholesteric liquid crystal layer having an orientation distribution can be formed by polymerizing the remaining isotropic part. Therefore, it is possible to form a plurality of regions in which the helical axes are aligned in different directions in the cholesteric liquid crystal layer. The monomer was applied at a temperature 30° higher than the isotropic temperature, and was then supercooled to a temperature 30° lower than the isotropic temperature.

[Liquid Crystal Device]

Figure 2:
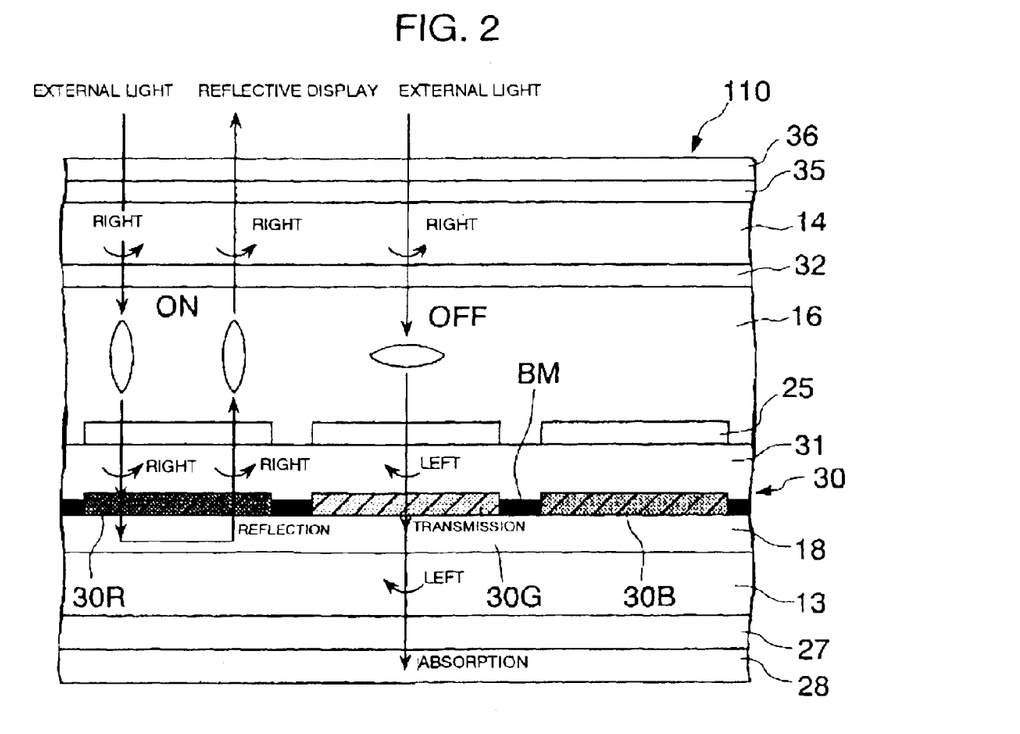
FIG. 2 is a schematic showing the partial sectional configuration of a liquid crystal display device according to an exemplary embodiment of the present invention.

A liquid crystal device using the above-described reflective plate 1 according to an embodiment will now be described with reference to the drawings. FIG. 2 is a schematic showing a partial sectional configuration of the liquid crystal device of this exemplary embodiment, and in this case, a passive-matrix reflective liquid crystal display device 110 is provided as an example.

In the liquid crystal display device 110 of this embodiment, as shown in FIG. 2, a lower substrate 13 and an upper substrate 14 are placed opposed to each other with a sealing material (not shown) therebetween, and a liquid crystal layer (phase-modulation liquid crystal layer) 16 made of STN (Super Twisted Nematic) liquid crystal is sealed in a space enclosed by the lower substrate 13, the upper substrate 14, and the sealing material. In this case, the lower substrate 13 is denoted by the same reference numeral as that of the transmissive substrate 13 of the above-described reflective plate 1 because they correspond to each other.

The lower substrate 13 and the upper substrate 14 are principally made of a transmissive material, such as glass or plastic, and a retardation film (quarter-wave plate) 27 and a lower polarizer 28 are formed in that order from the outer side of the lower substrate 13 (on the opposite side of a liquid crystal layer 16). On the other hand, a retardation film (quarter-wave plate) 35 and an upper polarizer 36 are also formed in that order from the outer side of the upper substrate 14 (on the opposite side of the liquid crystal layer 16).

A cholesteric liquid crystal layer 18 serving as a main reflective layer is provided on the inner side of the lower substrate 13 (on the side of the liquid crystal layer 16) with an alignment layer 40 therebetween, and the cholesteric liquid crystal layer 18, the alignment layer 40, and the lower substrate 13 are formed of those in the above-described reflective plate 1. A color filter layer 30 including R (red), G (green), and B (blue) pigment layers 30R, 30G, and 30B is formed on the cholesteric liquid crystal layer 18. The pigment layers 30R, 30G, and 30B are partitioned by a black matrix BM, each of the partitioned pigment layers forms a dot, and three dots formed by the three pigment layers 30R, 30G, and 30B constitute one pixel. A planarizing film (overcoat) 31 is stacked on the color filter layer 30 (pigment layers) so as to planarize the irregularities due to the color filter layer 30 and the black matrix BM.

Signal electrodes 25 made of a transparent conductive film, such as ITO, extend in stripes perpendicularly to the plane of the drawing on the planarizing film 31. Scanning electrodes 32 made of a transparent conductive film, such as ITO, extend in stripes in the right/left direction of the drawing on the inner side of the upper substrate 14 (on the side of the liquid crystal layer 16). The regions at which these electrodes 25 and 32 intersect serve as display regions, and the other regions in which the electrodes 25 and 32 do not intersect serve as non-display regions with the black matrix BM.

The upper polarizer 36 only transmits linearly polarized light that is polarized in one direction (the lateral direction of the drawing in this embodiment), and the retardation film 35 converts the linearly polarized light passing through the upper polarizer 36 into circularly polarized light. Therefore, the upper polarizer 36 and the retardation film 35 function as upper-substrate-side circularly-polarized-light incident means. The lower polarizer 28 only transmits linearly polarized light that is polarized in one direction (in the lateral direction of the drawing in this embodiment), and the retardation film 27 converts the linearly polarized light passing through the lower polarizer 28 into circularly polarized light. Therefore, the lower polarizer 28 and the retardation film 27 function as a lower-substrate-side circularly-polarized-light incident device. While light to be used for display is external light, such as solar light or illumination light, in the description of this exemplary embodiment, a semi-transmissive reflective liquid crystal device that admits backlight from the lower polarizer 28 may be used.

In the liquid crystal layer 16, liquid crystal molecules are aligned in the up/down direction of the drawing (perpendicularly to the substrate plane) in a state in which a voltage higher than or equal to the threshold is applied between the scanning electrode 25 and the signal electrode 32 (a selective-electric-field applied time), and are aligned in the right/left direction of the drawing (parallel to the substrate plane) in a state in which a voltage lower than or equal to the threshold is applied therebetween (a non-selective-electric-field applied time). Here, the "selective-electric-field applied time" and the "non-selective-electric-field applied time" means "the time in which the voltage applied to the liquid crystal layer is lower than the threshold voltage of the liquid crystal" and "the time in which the voltage applied to the liquid crystal layer is higher than or equal to the threshold voltage of the liquid crystal," respectively. In such a liquid crystal layer 16, the phase of incident light can be modulated depending on the application of a selective electric field. That is, in this embodiment, incident circularly polarized light can be transmitted as circularly polarized light which rotates in the same direction as that at the incidence without modulating the phase thereof when a selective electric field is applied, and incident circularly polarized light can be transmitted as circularly polarized light that rotates in the direction reverse to that at the incidence after modulating the phase thereof when a non-selective electric field is applied.

The cholesteric liquid crystal layer 18 has the same structure as that in the reflective plate 1 shown in FIG. 1, and the helical axes of the helical structures formed by cholesteric liquid crystal are aligned in various directions in the substrate plane. Therefore, color light that is closer to white light is reflected. Moreover, since the cholesteric liquid crystal layer 18 itself can be made of a thin film, the thickness of the liquid crystal cell in which the liquid crystal layer 16 is held between the substrates 13 and 14 can be made to be more uniform, and the reliability of the liquid crystal device is thereby increased. Furthermore, since the distribution of the refractive index increases in the cholesteric liquid crystal layer 18, light that is reflected by the cholesteric liquid crystal layer 18 can be scattered, the viewing angle for the reflective display can be increased, and it is unnecessary to provide a separate scattering layer.

A description is provided below of a display mechanism in the liquid crystal display device 110 of this embodiment. External light entering the liquid crystal display device 110 through the upper polarizer 36 and the retardation film 35 is converted into clockwise circularly polarized light, and enters the liquid crystal layer 16. When a voltage is applied between the scanning electrode 25 and the signal electrode 32 (selective-electric-field applied time), the liquid crystal layer 16 is in an ON state, and transmits the clockwise circularly polarized light unchanged. When a voltage is not applied between the scanning electrode 25 and the signal electrode 32 (non-selective-electric-field applied time), the liquid crystal layer 16 is in an OFF state, and transmits the clockwise circularly polarized light while converting the light into counterclockwise circularly polarized light.

A component having a predetermined wavelength of the clockwise circularly polarized light passing through the ON-state liquid crystal layer 16 is absorbed by the color filter layer 30. For example, a wavelength of color light serving as a complimentary color of R (red) is absorbed in the pigment layer 30R corresponding to R (red), a wavelength of color light serving as a complimentary color of G (green) is absorbed in the pigment layer 30G corresponding to G (green), and a wavelength of color light serving as a complimentary color of B (blue) is absorbed in the pigment layer 30B corresponding to B (blue). Therefore, for example, the wavelength of clockwise circularly polarized light passing through the pigment layer 30R corresponding to R (red) is approximately 600 nm to 650 nm.

The clockwise circularly polarized light that becomes color light with a wavelength in a specific wavelength region by passing through the color filter layer 30 is reflected by the cholesteric liquid crystal layer 18. In this case, the rotating direction is unchanged before and after reflection, and the reflected clockwise circularly polarized light is used for display after passing again through the color filter layer 30, the liquid crystal layer 16, the upper substrate 14, the retardation film 35, and the upper polarizer 36. During the non-selective-electric-field applied time of the liquid crystal layer 16, counterclockwise circularly polarized light enters the reflective layer 18. The counterclockwise circularly polarized light is not reflected by the reflective layer 18, passes therethrough toward the lower substrate 13, and is absorbed by the lower polarizer 28. Therefore, the counterclockwise circularly polarized light is not used for display.

[Modifications of Reflective Plate]

Modifications of the reflective plate of this embodiment are described below. A helical-axis-direction aligning device to align the helical axes of cholesteric liquid crystal in different directions in the substrate plane among the regions is principally described in the modifications. Components that are the same as those in the reflective plate shown in FIG. 1 are denoted by the same reference numerals, and descriptions thereof are omitted. The following reflective plates are also applicable as a main reflective layer including the cholesteric liquid crystal layer 18 of the liquid crystal display device 1 shown in FIG. 2.

Figure 3:
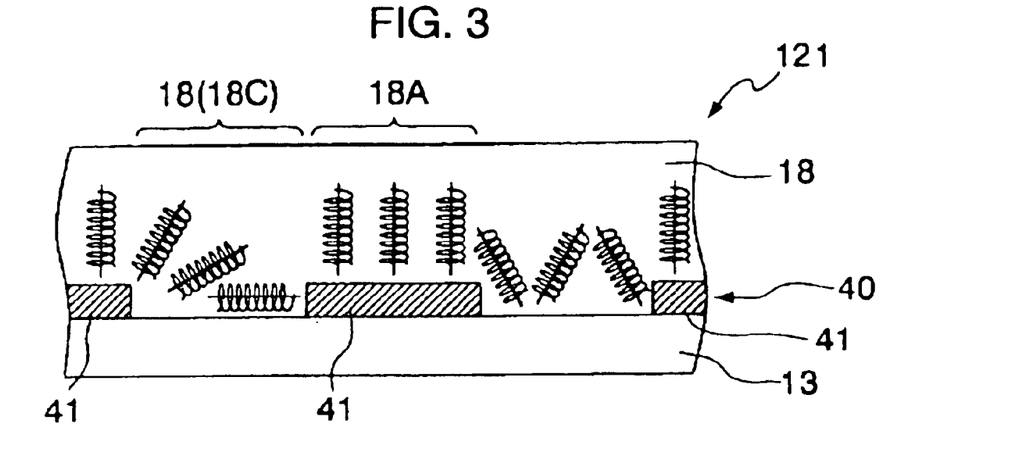
FIG. 3 is a schematic sectional view showing a first exemplary modification of the configuration of a reflective plate.

FIG. 3 is a schematic sectional view showing the structure of a reflective plate 121 in accordance with a first exemplary modification. In the reflective plate 121, an alignment layer 40 is locally formed on a transmissive substrate 13 inside the substrate plane. More specifically, homogeneous alignment layers 41 are formed in a matrix, and the alignment layer 40 functions as the helical-axis-direction aligning device.

In this case, in the regions in which the homogenous alignment layers 41 are formed (homogenous-alignment-layer forming region), the helical axes of the cholesteric liquid crystal are aligned substantially perpendicularly to the substrate plane, and helical-axis vertically-aligned cholesteric liquid crystal regions 18A are formed in these regions. On the other hand, in the regions in which the homogenous alignment layers 41 are not formed (homogenous-alignment-layer non-forming region), the helical axes of the cholesteric liquid crystal tilt at a predetermined angle to the substrate plane, or are aligned substantially parallel to the substrate plane, and helical-axis obliquely-aligned cholesteric liquid crystal regions 18B and/or helical-axis parallel-aligned cholesteric liquid crystal regions 18C are formed in these regions. By thus forming the alignment layers in the portions of the substrate plane, a plurality of regions in which the helical axes are aligned in different directions can be formed in a cholesteric liquid crystal layer 18.

Figure 4:
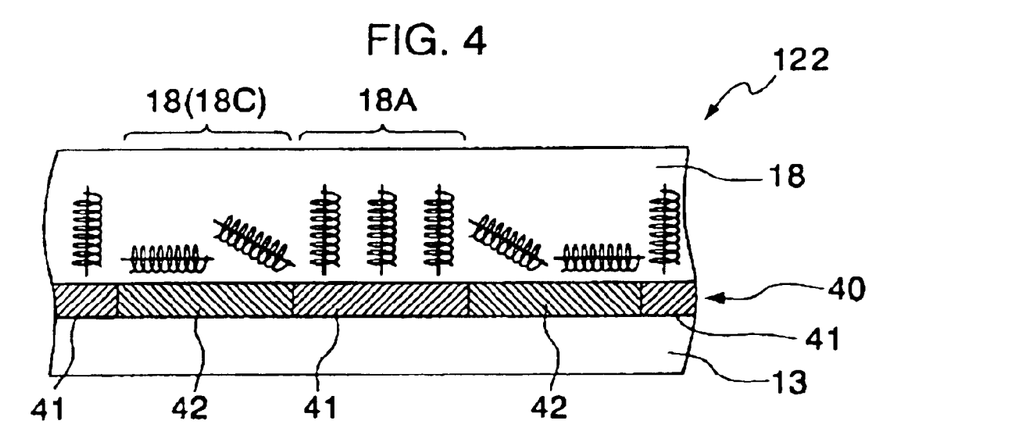
FIG. 4 is a schematic sectional view showing a second exemplary modification of the configuration of a reflective plate.

FIG. 4 is a schematic sectional view showing the structure of a reflective plate 122 as a second modification. In this reflective plate 122, homogeneous alignment layers 41 and homeotropic alignment layers 42 coexist as an alignment layer 40 on a transmissive substrate 13. More specifically, the homogeneous alignment layers 41 and the homeotropic alignment layers 42 are alternately formed in the same plane, and the alignment layer 40 including the homogeneous alignment layers 41 and the homeotropic alignment layers 42 functions as a helical-axis-direction aligning device.

In this case, the helical axes of cholesteric liquid crystal are aligned substantially perpendicularly to the substrate plane in the regions in which the homogeneous alignment layers 41 are formed, and helical-axis vertically-aligned cholesteric liquid crystal regions 18A are formed in these regions. On the other hand, the helical axes of the cholesteric liquid crystal are aligned parallel to the substrate plane in the regions in which the homeotropic alignment layers 42 are formed, and helical-axis parallel-aligned cholesteric liquid crystal regions 18C are formed in these regions. The helical axes of the cholesteric liquid crystal tilt at a predetermined angle to the substrate plane in the regions in which the homeotropic alignment layers 42 are formed or near the boundaries between the alignment layers 41 and 42, and helical-axis obliquely-aligned cholesteric liquid crystal regions 18B are formed in these regions. By thus forming the homogeneous alignment layers 41 and the homeotropic alignment layers 42 as the alignment layer in the same substrate plane, a plurality of regions in which the helical axes are aligned in different directions can be formed in a cholesteric liquid crystal layer 18.

Figure 5:
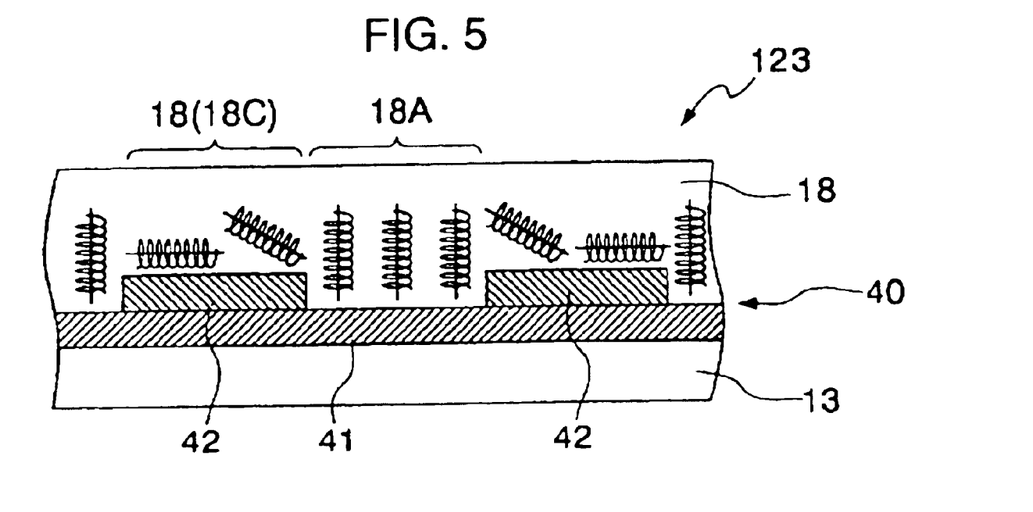
FIG. 5 is a schematic sectional view showing a third exemplary modification of the configuration of a reflective plate.

FIG. 5 is a schematic sectional view showing the structure of a reflective plate 123 in accordance with a third exemplary modification. In the reflective plate 123, a homogeneous alignment layer 41 is formed on a transmissive substrate 13, and a homeotropic alignment layer 42 is locally formed on the homogeneous alignment layer 41 in the substrate plane. Therefore, in the reflective plate 123 of the third modification, the alignment layer 40 is formed of a laminated member formed of the homogenous alignment layer 41 and the locally formed homeotropic alignment layer 42. In this case, laminated portions and non-laminated portions of the layers 41 and 42 are formed in the laminated alignment layer 40 so that at least some portions of the layers 41 and 42 are in contact with a cholesteric liquid crystal layer 18, and the alignment layer 40 functions as a helical-axis-direction aligning device. Such a laminated alignment layer 40 can be formed by stacking the homogeneous alignment layer 41 and the homeotropic alignment layer 42, and partially removing the homeotropic alignment layer 42 formed on the front side with a mask.

In this case, in the regions of the cholesteric liquid crystal layer 18 in contact with the homogeneous layer 41, that is, in the regions in which the homeotropic alignment layers 42 are partially removed, the helical axes of the cholesteric liquid crystal are aligned substantially perpendicularly to the substrate plane, and helical-axis vertically-aligned cholesteric liquid crystal regions 18A are formed in these regions. On the other hand, in the regions in contact with the locally formed homeotropic alignment layer 42, the helical axes of the cholesteric liquid crystal are aligned parallel to the substrate plane, and helical-axis parallel-aligned cholesteric liquid crystal regions 18C are formed in these regions. In the regions in contact with the homeotropic alignment layer 42, or near the boundaries between the regions in contact with the alignment layers 41 and 42, the helical axes of the cholesteric liquid crystal tilt at a predetermined angle to the substrate plane, and helical-axis obliquely-aligned cholesteric liquid crystal regions 18B are formed in these regions. By thus forming the alignment layer as a laminated member formed of the homogenous alignment layer 41 and the homeotropic alignment layer 42, and causing the alignment layers 41 and 42 to be in contact with the cholesteric liquid crystal layer 18 by partially removing the homeotropic alignment layer 42 using a mask, a plurality of regions in which the helical axes are aligned in different directions can be formed in the cholesteric liquid crystal layer 18.

Figure 6:
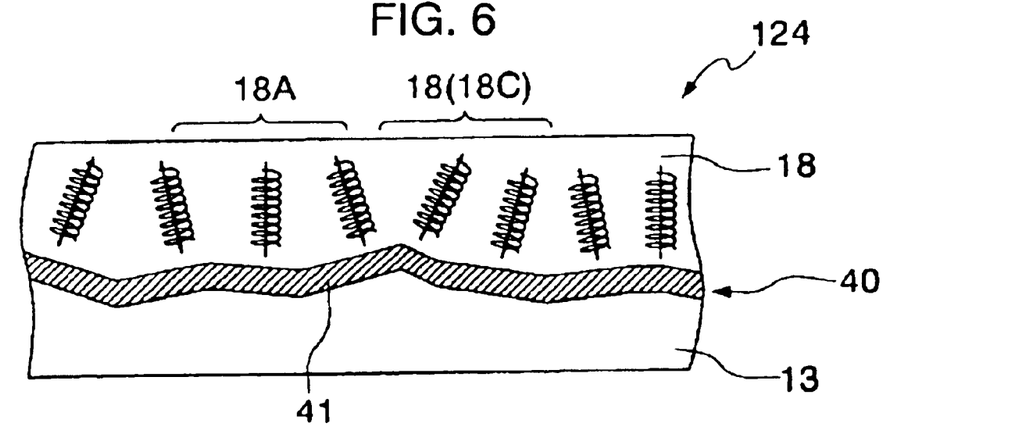
FIG. 6 is a schematic sectional view showing a fourth exemplary modification of the configuration of a reflective plate.

FIG. 6 is a schematic sectional view showing the structure of a reflective plate 124 in accordance with a fourth exemplary modification. In this reflective plate 124, irregularities are formed on the surface of a transmissive substrate 13, for example, by embossing, and an alignment layer 40, more specifically, a homogeneous alignment layer 41, is formed on the transmissive substrate 13. In this case, the alignment layer 40 (homogeneous alignment layer 41) also has irregularities corresponding to the irregularities of the transmissive substrate 13, and the alignment layer 40 (homogeneous alignment layer 41) having the irregularities functions as a helical-axis-direction aligning device. In a cholesteric liquid crystal layer 18 of such a reflective plate 124, the helical axes of cholesteric liquid crystal placed on the irregularities of the alignment layer 40 (homogeneous alignment layer 41) tilt in various directions with respect to the substrate plane because of the irregularities, and a plurality of regions in which the helical axes are aligned in different directions are formed in the substrate plane. That is, by forming irregularities on the substrate plane, at least two of a helical-axis vertically-aligned cholesteric liquid crystal region 18A, a helical-axis obliquely-aligned cholesteric liquid crystal region 18B, and a helical-axis parallel-aligned cholesteric liquid crystal region 18C can be formed.

Figure 7:
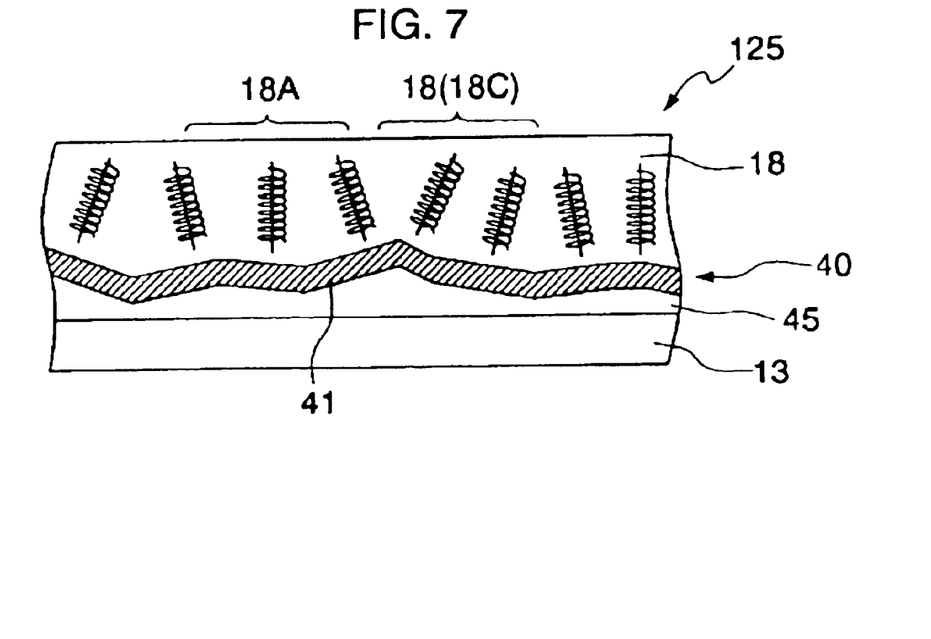
FIG. 7 is a schematic sectional view showing a fifth exemplary modification of the configuration of a reflective plate.

FIG. 7 is a schematic that shows a reflective plate 125 in accordance with a fifth exemplary modification in which an acrylic layer 45 is formed on a transmissive substrate 13, and irregularities are formed as a helical-axis-direction aligning device on the acrylic layer 45 so as to form irregularities on an alignment layer 40 (homogeneous alignment layer 41).

Figure 8:
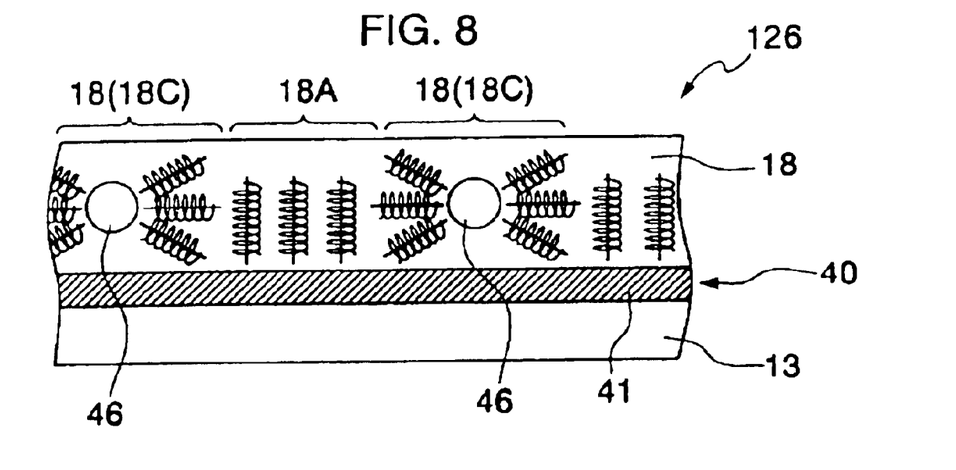
FIG. 8 is a schematic sectional view showing a sixth exemplary modification of the configuration of a reflective plate.

FIG. 8 is a schematic sectional view showing the structure of a reflective plate 126 in accordance with a sixth exemplary modification. In this reflective plate 126, a homogeneous alignment layer 41 is formed as an alignment layer 40 on a transmissive substrate 13, and a cholesteric liquid crystal layer 18 is formed on the homogeneous alignment layer 41. In this case, filling beads 46 serving as a helical-axis-direction aligning means are charged in the cholesteric liquid crystal layer 18, and for example, the filling rate is determined to a rate at which the filling beads 46 do not touch.

In this case, the helical axes of cholesteric liquid crystal on the homogeneous alignment layer 41 are aligned perpendicularly to the substrate plane, and are held in that direction in the regions in which the filling beads 46 are not charged, thereby forming helical-axis vertically-aligned cholesteric liquid crystal regions 18A. On the other hand, in the regions in which the filling beads 46 are charged, that is, near the surfaces of the filling beads 46, the helical axes of the cholesteric liquid crystal are not held perpendicularly to the substrate plane, and instead are aligned parallel to or tilt relative to the substrate plane. Therefore, by filling the filling beads 46 in the cholesteric liquid crystal layer 18, a plurality of regions in which the helical axes of the cholesteric liquid crystal are aligned in different directions can be formed in the cholesteric liquid crystal layer 18.

While the filling beads 46 are made of glass in the reflective plate 126, they may be made of resin. The surfaces of the filling beads 46 may be subjected to a homeotropic surface treatment, more specifically, may be covered with a fluoric coating having high surface tension. Such a coating makes it possible to align the cholesteric liquid crystal in more directions on the surfaces of the filling beads 46, and therefore, to more reliably form a plurality of regions in which the helical axes of the cholesteric liquid crystal are aligned in various directions. While the beads are used as fillers in this embodiment, cylindrical fibers may be used.

[Electronic Devices]

A description is provided below of an example of an electronic device having the liquid crystal display device of the above embodiment.

Figure 10:
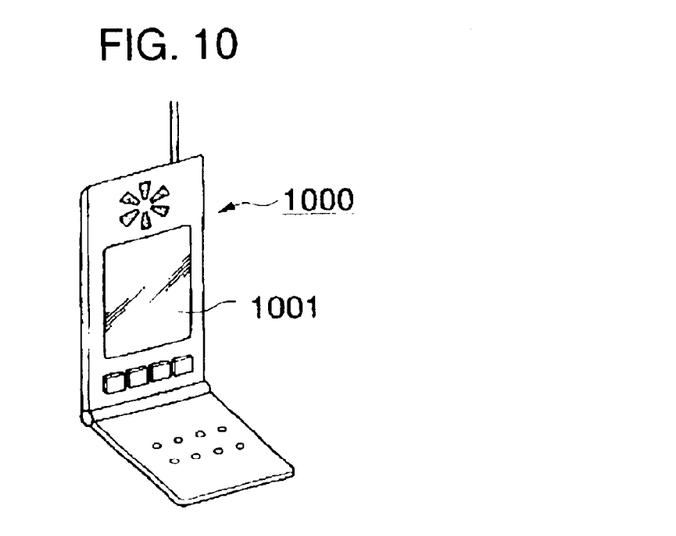
FIG. 10 is a perspective view of an example of an electronic device according to the present invention.

FIG. 10 is a perspective view showing an example of a portable telephone. In FIG. 10, reference numerals 1000 and 1001 denote a main body of the portable telephone, and a liquid crystal display section using the above-described liquid crystal display device 110, respectively.

Figure 11:
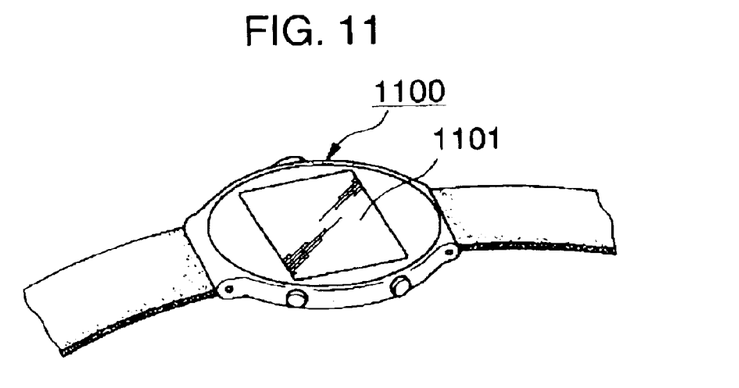
FIG. 11 is a perspective view of another example of an electronic device according to the present invention.

FIG. 11 is a perspective view showing an example of a wristwatch-type electronic device. In FIG. 11, reference numerals 1100 and 1101 denote a watch body, and a liquid crystal display section using the above-described liquid crystal display device 110, respectively.

Figure 12:
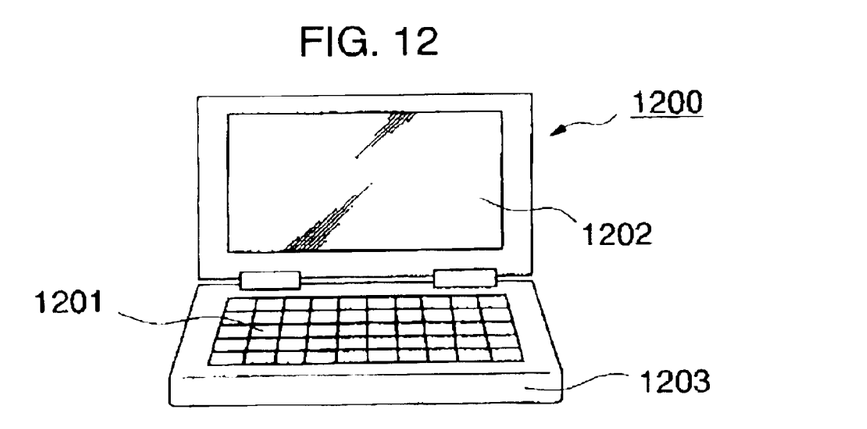
FIG. 12 is a perspective view of a further example of an electronic device according to the present invention.

FIG. 12 is a perspective view showing an example of a portable information processing device, such as a word processor or a personal computer. In FIG. 12, reference numerals 1200, 1202, 1204, and 1206 denote an information processing device, an input section such as a keyboard, a main body of the information processing device, and a liquid crystal display section using the above-described liquid crystal display device 110, respectively.

Since the electronic devices shown in FIGS. 10 to 12 use the liquid crystal display device 110 of the above-described embodiment, they can produce highly visible reflective display.

The technical field of the present invention is not limited to the above exemplary embodiment, and various modifications are possible without departing from the scope of the present invention. For example, while the passive-matrix reflective liquid crystal display device is described in the above exemplary embodiment, the present invention is not limited thereto, and is also applicable to an active-matrix liquid crystal display device. Furthermore, while the color filter layer is formed on the inner side of the lower substrate in the above embodiment, it may be formed on the inner side of the upper substrate.

[Advantages]

As described in detail above, in the present invention, since the cholesteric liquid crystal layer in the reflective plate includes, in the substrate plane, a plurality of regions in which the helical axes of the cholesteric liquid crystal are aligned in different directions, the regions can reflect color light components having different wavelengths. Therefore, the cholesteric liquid crystal layer can reflect light formed of light components of different colors (for example, white light) as a whole. For example, in a case in which the reflective plate is applied to a reflective liquid crystal display device or the like, white light can be appropriately reflected for display.

Since the cholesteric liquid crystal layer is used as the main reflective layer by itself, it can be made of a thin film, and this enhances the uniformity of the thickness of the liquid crystal cell when the reflective plate is applied to a reflective layer of a reflective liquid crystal display device. Furthermore, since the helical axes of the helical structures formed by the cholesteric liquid crystal are aligned in various directions in the substrate plane in the present invention, the distribution of the refractive index is widened, and therefore, reflected light can be scattered widely.

What is claimed is:

1. A reflective plate, comprising:
   a substrate;
   a cholesteric liquid crystal layer formed over the substrate, the cholesteric liquid crystal layer including a polymerized cholesteric liquid crystal monomer with cholesteric liquid crystal molecules in a fixed alignment state, the cholesteric liquid crystal molecules each having a helical axis, the helical axes of the cholesteric liquid crystal molecules being aligned in different directions at least in a plane of said substrate; and
   an alignment layer formed locally between the substrate and the cholesteric liquid crystal layer so that regions where the alignment layer is not formed are located between regions where the alignment layer is formed, the helical axes of the cholesteric liquid crystal molecules adjacent to regions where the alignment layer is formed being aligned in one direction and the helical axes of the cholesteric liquid crystal molecules adjacent to regions where the alignment layer is not formed being aligned in another direction different from the one direction.

2. The reflective plate according to claim 1, said cholesteric liquid crystal layer including at least two of a cholesteric liquid crystal region in which the helical axes are aligned substantially perpendicularly to the plane of said substrate, a cholesteric liquid crystal region in which the helical axes are aligned substantially parallel to the plane of said substrate, and/or a cholesteric liquid crystal region in which the helical axes tilt at a predetermined angle to the plane of said substrate.

3. A liquid crystal device, comprising:
   the reflective plate according to claim 1.

4. An electronic device, comprising:
the liquid crystal device according to claim 3.

5. A liquid crystal device, comprising:
a liquid crystal cell that includes:
   a liquid crystal layer, an upper substrate and a lower substrate that oppose each other and that are made of a transmissive substrate, the liquid crystal layer being held between the upper and lower substrates, and
   a reflective layer capable of reflecting at least circularly polarized light that rotates in a predetermined direction, the reflective layer being provided on the inner side of said lower substrate, and having the reflective plate according to claim 1.

6. The reflective plate according to claim 1, the helical axes being aligned in unparallel directions in the plane of said substrate.

7. The reflective plate according to claim 1, the alignment layer capable of aligning the cholesteric liquid crystal that is formed between said substrate and said cholesteric liquid crystal layer, said alignment layer including a homeotropic alignment layer and a homogeneous alignment layer, and said homeotropic alignment layer and said homogeneous alignment layer being in contact with said cholesteric liquid crystal layer.

8. The reflective plate according to claim 1, the alignment layer capable of aligning the cholesteric liquid crystal that is formed between said substrate and said cholesteric liquid crystal layer, and said alignment layer having irregularities on a surface thereof along a border with said cholesteric liquid crystal layer.

9. A reflective plate, comprising:
a substrate;
a cholesteric liquid crystal layer formed on the substrate, the cholesteric liquid crystal layer including a polymerized cholesteric liquid crystal monomer with cholesteric liquid crystal molecules in a fixed alignment state, the cholesteric liquid crystal molecules having helical axes, the helical axes of the cholesteric liquid crystal of said cholesteric liquid crystal molecules being aligned in different directions at least in a plane of said substrate; and
a helical-axis-direction aligning device to align the helical axes of the cholesteric liquid crystal in different directions in the plane of said substrate, said helical-axis-direction aligning device being a filler charged in said cholesteric liquid crystal layer.

10. The reflective plate according to claim 9, the surface of said filler being subjected to homeotropic surface treatment.

11. A reflective plate comprising:
a substrate; and
a cholesteric liquid crystal layer including a polymerized cholesteric liquid crystral monomer with cholersteric liquid crystal molecules in a fixed alignment state the cholesteric liquid crystal molecules having a helical axis, the cholesteric liquid crystal layer including a first region in which the helical axes are aligned substantially parallel to the plane of the substrate, and a second region in which the helical axes are aligned at least one of perpendicular to the plane of the substrate and/or at a tilt to the plane of the substrate.

12. A reflective plate comprising:
a substrate;
alignment layer or layers disposed over the substrate, the alignment layer or layers having a surface profile that is different at different regions thereof; and
a cholesteric liquid crystal layer formed adjacent to a side of the alignment layer or layers opposite the substrate, the cholesteric liquid crystal layer including a polymerized cholesteric liquid crystal monomer with cholesteric liquid crystal molecules in a fixed alignment state, the cholesteric liquid crystal molecules having helical axes in fixed alignment states that coorespond to the surface profile of the alignment layer or layers so that helical axes of the cholesteric liquid crystal align in different directions at different regions at least in a plane of the substrate.

* * * * *